United States Patent
Ishino et al.

(10) Patent No.: US 8,003,155 B2
(45) Date of Patent: *Aug. 23, 2011

(54) PACKED FROZEN SUSHI PRODUCT

(75) Inventors: Yuji Ishino, Ishikawa (JP); Hironobu Kadoya, Ishikawa (JP)

(73) Assignee: Polar Star Co., Ltd. (JP)

( * ) Notice: Subject to any disclaimer, the term of this patent is extended or adjusted under 35 U.S.C. 154(b) by 1012 days.

This patent is subject to a terminal disclaimer.

(21) Appl. No.: 10/570,016

(22) PCT Filed: Aug. 27, 2004

(86) PCT No.: PCT/JP2004/012773
§ 371 (c)(1),
(2), (4) Date: Feb. 28, 2006

(87) PCT Pub. No.: WO2005/020712
PCT Pub. Date: Mar. 10, 2005

(65) Prior Publication Data
US 2007/0065543 A1    Mar. 22, 2007

(30) Foreign Application Priority Data
Aug. 29, 2003 (JP) ................ 2003-308140

(51) Int. Cl.
*A23B 4/06* (2006.01)
*B65B 55/00* (2006.01)
*B65D 81/34* (2006.01)

(52) U.S. Cl. ........ 426/643; 426/107; 426/234; 426/393; 426/641

(58) Field of Classification Search ................ 426/643, 426/641, 107, 234; 427/393
See application file for complete search history.

(56) References Cited

U.S. PATENT DOCUMENTS

| | | | | |
|---|---|---|---|---|
| 386,081 A * | 7/1888 | Hayes | ................ | 242/129.3 |
| 2,808,192 A * | 10/1957 | Raisin | ................ | 229/186 |
| 5,230,914 A * | 7/1993 | Akervik | ................ | 426/107 |
| 5,540,944 A * | 7/1996 | Reutimann | ................ | 426/296 |
| 5,861,184 A * | 1/1999 | Ishino et al. | ................ | 426/107 |
| 5,863,576 A * | 1/1999 | Guarino | ................ | 426/107 |
| 5,863,578 A * | 1/1999 | Guarino | ................ | 426/113 |

FOREIGN PATENT DOCUMENTS

JP    57-063082    9/1982
(Continued)

OTHER PUBLICATIONS

Translation of Ishino et al. (JP 2001275591 A), see above.*

(Continued)

*Primary Examiner* — Brent T. O'Hern
(74) *Attorney, Agent, or Firm* — Ostrolenk Faber LLP

(57) ABSTRACT

A packed frozen sushi product comprising a vacuumed, frozen and hermetically sealed flexible plastic bag, an open-topped plastic box placed in the bag, a laminated metal foil placed on the bottom of said box, and a frozen sushi product contained in the box with a surface or surfaces of its sushi material or materials on the laminated metal foil; the plastic bag, the box, the laminated metal foil and the frozen sushi product being frozen together in a unified form, the packed frozen sushi product thereby being adapted for microwave cooking. Water vapor emanating from the sushi product in thawing is allowed to flow through a space formed around the sushi material to heat a shaped rice section and the sushi material or materials, thereby diminishing unevenness in temperature distribution after thawing. By virtue thereof, a packed frozen sushi product suitable for mass production is provided.

3 Claims, 7 Drawing Sheets

FOREIGN PATENT DOCUMENTS

| | | |
|---|---|---|
| JP | 3229766 | 10/1991 |
| JP | 3201933 B2 | 6/2001 |
| JP | 2001275591 A * | 10/2001 |
| JP | 3369550 | 11/2002 |

OTHER PUBLICATIONS

International Search Report PCT/JP2004/012773 dated Nov. 29, 2004.

* cited by examiner

PACKED FROZEN SUSHI PRODUCT

CROSS REFERENCE TO RELATED APPLICATIONS

The present application is a 35 U.S.C. §371 national phase conversion of International Application No. PCT/JP2004/012773 filed Aug. 27, 2004, which claims priority from Japanese patent application No. 2003-308140 filed Aug. 29, 2003, incorporated herein by reference.

TECHNICAL FIELD

The present invention relates to a packed frozen sushi product, more particularly, to a packed frozen sushi product suitable for thawing by means of a microwave oven. The present invention also relates in particular to a vacuum-packed frozen sushi product adapted thawing by a microwave oven by shielding a sushi material or materials, which should not be heated to 40° C. or higher, from microwaves emitted from the microwave oven by means of a laminated metal foil. Further, the present invention relates to a packed frozen sushi product suitable for thawing by means of a microwave oven, in which a sushi product so prepared that a shaped rice section is topped with a sushi material or materials which should not be heated to a temperature as high as 40° C. or higher, and is contained in a plastic packing box with its sushi material or materials in contact with a laminated metal foil, the sushi product is placed in a packing bag made of a plastic film together with the box, and then the packing bag is vacuumed in such a manner that the sushi product is in tight contact with the plastic film of the packing bag, and the resulting pack is frozen in a unified form.

BACKGROUND ART

For example, in the case of a rod-shaped sushi (bo-zushi), vinegared rice is shaped, and the shaped rice section is topped with a sushi material or materials such as boned and prepared red sea bream, sockeye salmon or mackerel together with a thin slice of kombu kelp (shiroita kombu) cooked in a broth seasoned with vinegar, sugar and salt, and resultant is shaped into various shapes such as the rod-shape, and the shaped sushi product is wrapped with a bamboo sheath and placed in a packing bag made of a plastic film and vacuum-packed, the vacuum packed sushi product is frozen with a brine such as ethanol or the (vacuum-packed) shaped sushi product is frozen by slow freezing such as air-blast freezing or nitrogen or carbon dioxide freezing, and the frozen shaped sushi product is placed in a packing bag made of a plastic film and vacuum-packed to thereby prepare a vacuum-packed frozen sushi product.

Since such packed frozen sushi products frozen prepared using brine freezing process are vacuum-packed before the freezing, the attachment of bacteria and absorption of odor from the coolant gas in a freezing room, and therefore, these are hygienically superior to, for example, packed frozen sushi products prepared by vacuum-packing sushi products posterior to freezing of the sushi products by slow freezing such as air-blast freezing, nitrogen or carbon dioxide freezing. In particular, such packed frozen sushi products frozen by brine freezing can be frozen-stored stably, for example, over a long period of 3 months or longer when stored at a storage temperature of −18° C., or can be stored for 6 months when stored at a storage temperature of −50° C.

However, packed frozen sushi products which have been frozen-stored need to be thawed before being served at a meal. Methods of thawing for packed frozen sushi products include natural thawing, running water thawing, steam thawing, hot water thawing and microwave thawing. Of these, microwave thawing is quite suitable for thawing of packed frozen sushi products due to its extremely short thawing time and high thawing yield. For example, in the case of above mentioned rod-shaped sushi product, natural thawing at room temperature will require five hours, while microwave thawing will allow thawing in four minutes, enabling instant and convenient response to the demands compared to natural thawing at room temperature.

However, in the case of microwave thawing, there are differences in the quantitative value and the calorific value from microwave absorption between the sushi material or materials and the rice, and furthermore, because the surface area is better heated compared to the center area, a part of the sushi material or materials is heated to above the preferred temperatures compared to the rice, where the sushi material or materials result in the so-called cooked condition and is considered to impair the flavor, therefore, this method of thawing is in actuality not in use. Furthermore, in the case of a rod-shaped sushi for example, the rice section is commonly preferred to be effected to a tepid temperature, for example, between 15 to 25° C., preferably between 20 to 25° C., however, the sushi material or materials section is preferred to be effected to temperatures lower than the rice section, for example between 10 to 25° C., preferably between 10 to 25° C. Meanwhile, when thawing a packed frozen sushi product using a microwave oven, the material or materials are heated to relatively high temperatures so to impair the flavor of the sushi, making thawing using a microwave oven with the desired result difficult. Given this factor, in order to overcome the hurdle of thawing a packed frozen sushi product using electromagnetic heating such as one using a microwave oven, where the sushi flavor is impaired by the sushi material or materials getting heated to relatively high temperatures, the present inventors suggested the so-called packed frozen sushi product, in which a sushi topped with its sushi material or materials is packed in a plastic packing film with a metal foil positioned over the plastic film to cover the sushi material or materials on top of the rice, packing it further with a plastic packing film, placing this packed sushi product in a plastic packing bag, degassing and hermetically packing before the entire product is wholly brine frozen in the above mentioned condition for frozen storage (see Japanese Patent publication No. 3201933, Japanese Patent Publication No. 3229766 and Japanese Patent Publication No. 3369550).

In the case of such packed frozen sushi products, where a plastic packing film is placed over the sushi material or materials, with a metal foil placed over it, and the above mentioned rice and the sushi material or materials are packed together in a plastic packing film, when thawing using the electromagnetic heating process such as in a microwave oven, the rice section left uncovered and exposed to microwave irradiation is heated by the microwave, however, the sushi material or materials section shielded from the microwave by the metal foil is left unheated by the microwave, and remains halfway thawed essentially. However, heat applied to the rice will generate water vapor from the rice section, and the water vapor generated will fill the space inside the plastic packing film, and steam heat the space inside the plastic packing film during heating inside a microwave oven and after removing the sushi from the microwave oven, enabling the rice to warm to a tepid temperature and the sushi material or materials to warm to approximately 10° C.

As such, a packed frozen sushi product, packed in a plastic packing film with a metal foil positioned over the sushi material or materials to prevent the material or materials from being heated by the microwave, is steamed by the water vapor generated at the time of thawing, and therefore is suitable for thawing using a microwave oven. However, a packed frozen sushi product with a metal foil placed over it and packed in a plastic packing film is required to place the metal foil on top of the sushi material or materials packed inside the first plastic packing film before packing the sushi with the second plastic packing film, in order to electrically isolate the metal foil from the surroundings so to prevent any discharge from the sides of the metal foil at the time of microwave irradiation. Furthermore, the metal foil needs to be placed over the material or materials of the sushi without getting misaligned, when packing the sushi with the second plastic packing film, and also, the sushi placed on the plastic packing film needs to be packed air-tight. These procedures required in manufacturing packed frozen sushi products packed in plastic packing films require much attention and skill, and are considered to be an obstacle to mass manufacturing. Packed frozen sushi products require much manpower and time, and remain as a problem in order to respond to the customer demands.

It is an object of the present invention to provide a packed sushi product which is capable of solving the problems inherent in the frozen sushi product wrapped with a plastic film for wrapping and which is adapted for thawing by means of a microwave oven.

DISCLOSURE OF INVENTION

The present inventors have found that when a sushi product such as a rod-shaped sushi product is placed in a box, and the sushi product is placed in a flexible packing bag together with the box containing the same, and the packing bag is vacuumed, the flexible packing bag is thereby pushed by external pressure and brought in tight contact with outer and inner surfaces of the box and an exposed outer surface of the sushi product and can be sealed in such an internal volume-diminished condition, and by virtue thereof, when the packed sushi product is heated by means of a microwave oven, a sushi material or materials can be heated by steaming.

The present invention has been made with a view to providing a packed frozen sushi product which can be prepared on a large scale and which is adapted for thawing by means of a microwave oven.

In other words, the present invention resides in a packed frozen sushi product comprising a vacuumed and hermetically sealed flexible plastic bag, an open-topped plastic box placed in the bag, a laminated metal foil placed on the bottom of the box, and a frozen sushi product contained in the box and placed with its sushi material or materials facing to the metal foil; the packed frozen sushi product thereby being (well) adapted for microwave cooking. Also, the present invention resides in a packed frozen sushi product comprising a vacuumed and hermetically sealed flexible plastic bag, an open-topped plastic box placed in the bag, a laminated metal foil placed on the bottom of the box, and a frozen sushi product placed with its sushi material or materials placed on a shaped rice section on the laminated metal foil; said packed frozen sushi product thereby being adapted for microwave cooking. Further, the present invention resides in a packed frozen sushi product comprising a vacuumed, frozen and hermetically sealed flexible plastic bag, an open-topped plastic box placed in the bag, a laminated metal foil placed on the bottom of the box, and a frozen sushi product placed in the box with a surface of its sushi material or materials on the laminated metal foil; the plastic bag, the plastic box, the laminated metal foil and the (frozen) sushi product being frozen together in a unified form; the packed frozen sushi product thereby being (well) adapted for microwave cooking. Moreover, a method for preparing a packed frozen sushi product, the method comprising topping a shaped rice section with a sushi material or materials to prepare a sushi product, placing the prepared sushi product in a plastic box on the bottom of which is placed a laminated metal foil, with the sushi material or materials down and in contact with the laminated metal foil on the bottom of the plastic box, placing the plastic box containing the sushi product in a flexible plastic packing bag, vacuuming and hermetically sealing the packing bag to prepare a vacuum-packed sushi product, and cooling the vacuum-packed sushi product with a refrigerant cooled to a freezing temperature to freeze the packing bag and the contents including the sushi product or products together in a unified form. Furthermore, the present invention resides in a method for preparing a packed frozen sushi product, the method comprising topping a shaped rice section with a sushi material or materials to prepare a sushi product, placing a laminated metal foil on the sushi material or materials of the prepared frozen sushi product, placing the sushi product with the laminated metal foil placed thereon is placed in a plastic box with the sushi material or materials down, placing the plastic box containing the sushi product in a flexible plastic packing bag, vacuuming and hermetically sealing the packing bag to prepare a vacuum-packed sushi product, and cooling said vacuum-packed sushi product with a refrigerant cooled to a freezing temperature to freeze the packing bag and the contents including the sushi product together in a unified form. Further, the present invention resides in a method for preparing a packed frozen sushi product, the method comprising topping a shaped rice section with a sushi material or materials to prepare a sushi product, freezing the prepared sushi product to prepare a frozen sushi product, placing the prepared frozen sushi product in a plastic box on the bottom of which is placed a laminated metal foil, with the sushi material or materials down and in contact with the laminated metal foil on the bottom of the plastic box, placing the plastic box containing the sushi product in a flexible plastic packing bag, vacuuming and hermetically sealing the packing bag to prepare a vacuum-packed sushi product, and cooling said vacuum-packed sushi product with a refrigerant cooled to a freezing temperature to freeze said packing bag and the contents including the sushi product or products together in a unified form. In addition, the present invention resides in a method for preparing a packed frozen sushi product, the method comprising topping a shaped rice section with a sushi material or materials to prepare a sushi product, airtightly packing the prepared sushi product in a plastic film, followed by freezing to prepare a plastic film-packed frozen sushi product in a unified form, placing the prepared frozen sushi product in a plastic box on the bottom of which is placed a laminated metal foil, with the sushi material or materials down and in contact with the laminated metal foil on the bottom of the plastic box, placing the plastic box containing the sushi product in a flexible plastic packing bag, vacuuming and hermetically sealing the packing bag to prepare a vacuum-packed sushi product; and cooling the vacuum-packed sushi product with a refrigerant cooled to a freezing temperature to freeze the packing bag and the contents including the sushi product or products together in a unified form. Besides these, the present invention resides in a method for cooking the packed frozen sushi product by microwave heating, the method comprising applying heat to "a packed frozen sushi product comprising a vacuumed and hermetically sealed flexible plastic bag, an open-topped plastic box placed in the plastic bag, a laminated metal foil placed on the bottom of the box, and a frozen sushi product placed on the laminated metal foil in the box with its sushi material or materials on said laminated metal foil, said frozen sushi product being frozen alone or together with the laminated metal foil or together with the plastic bag, the box and the laminated metal foil in a unified form; then packed frozen sushi product thereby being adapted for microwave cooking by microwave heating to thereby bring a temperature of an exposed side portion of the shaped rice section to 40° C. or higher and a temperature of a side portion of the sushi material or materials to 10° C. or lower, followed by termination of the microwave heating, allowing the resulting packed sushi product to stand for a period of 15 minutes to 1 hour without unpacking to effect steaming and thereby to bring the temperature of the sushi material or materials to a temperature exceeding 15° C. but 20° C. or lower. Further, the present invention resides in a method for cooking the packed frozen sushi product according to any one of claims 1 to 6 by microwave heating, said method comprising applying heat to "a packed frozen sushi product comprising a vacuumed and hermetically sealed flexible plastic bag, an open-topped plastic box placed in the plastic bag, a laminated metal foil placed on the bottom of the box, and a frozen sushi product placed on the laminated metal foil in the box with its sushi material or materials on said laminated metal foil, said frozen sushi product being frozen alone or together with the laminated metal foil or together with the plastic bag, the box and the laminated metal foil in a unified form; the packed frozen sushi product thereby being adapted for microwave cooking" by microwave heating to thereby bring a temperature of an exposed side portion of the shaped rice section to 40° C. or higher, followed by termination of the microwave heating, and allowing the resulting packed sushi product to stand for a period of 15 minutes to 1 hour without unpacking to allow water vapor emanating at least from the shaped rice section to flow in a space between the sushi product and the box, thereby steaming the shaped rice section and the sushi material or materials to bring temperatures a portion of the shaped rice section and the sushi material or materials which have temperatures of 15° C. or lower to 15° C. or higher.

BEST MODE FOR CARRYING OUT THE INVENTION

Figure 1:
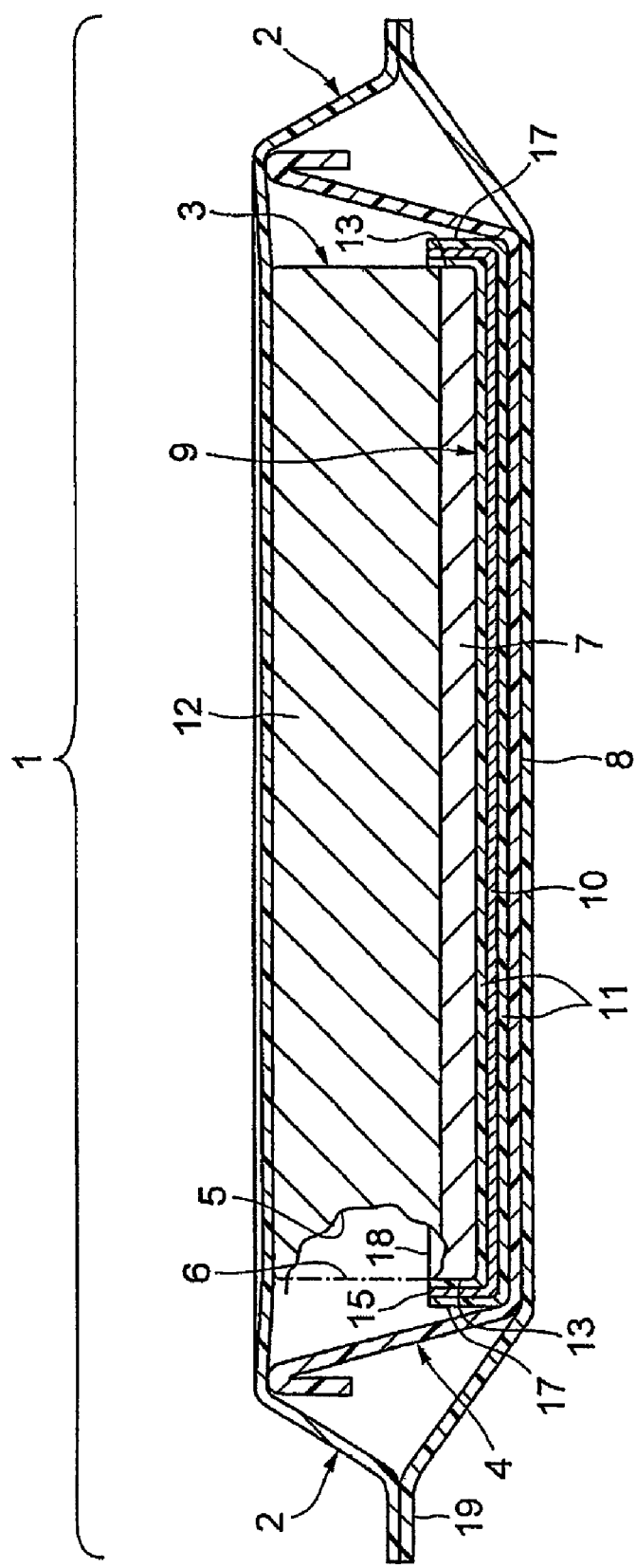
FIG. 1 is a schematic front sectional partially cut away view schematically illustrating one Example of the present invention.

In the present invention, a sushi product means a rod-shaped sushi product (bo-zushi), a pressed sushi product (oshi-zushi), a sushi product pressed in a box and topped with a thin slice of kelp konbu together with other sushi material or materials (battera) or a hand-shaped sushi product (nigiri-zushi). In the present invention, procedure for freezing a sushi product (freezing of a sushi product) is performed by placing a sushi product with its sushi material or materials (gu or sushi neta) down in a plastic box on the bottom of which a laminated metal foil is placed, placing the plastic box which contains the sushi product and which is left open in a flexible plastic packing bag, degassing the packing bag, and freezing the degassed packing bag by brine freezing, air-blast freezing, nitrogen or carbon dioxide freezing or the like. However, it is preferred from the hygiene viewpoint to prepare such a sushi product by brine-freezing the degassed flexible plastic packing bag in which the sushi product is contained because a refrigerant does not directly contact the sushi product. Further, in the present invention, the sushi products processed into packed frozen sushi products include sushi products of shaped rice topped with sushi material or materials, for example, a rod-shaped sushi product, a sushi product pressed in a box, i.e., a boxed sushi product (hako-zushi), a hand-shaped sushi product and the like, and one sushi product may be packed and frozen or a plurality of sushi products may be packed and frozen together. The sushi products used in the present invention may be those which are precut so as to be separable into pieces afterward.

In the packed frozen sushi product of the present invention, the box and the packing bag are made of a microwave-transparent material, for example, a plastic box and a plastic packing bag or the like are used. In the present invention, when a sushi product is placed in a plastic box and packed, since a laminated metal foil is placed on the box bottom on which sushi material or materials are rested, microwaves are blocked by the laminated metal foil to prevent the sushi material or materials from being heated during heating in a microwave oven. In the present invention, the laminated metal foil may be any one so long as it is capable of blocking microwaves and causes no electric discharge between an inner wall of a microwave oven and ingredients. In the present invention, the laminated metal foil is one having its metal foil such as an aluminum foil entirely covered with an electrical insulating material such as a plastic or one having its metal foil covered with an electrical insulating material such as a plastic to such an extent that the metal foil causes no electric discharge.

In the present invention, the plastic box for containing a sushi product or products may have such a shape as in a generally used box, and its bottom has such a size that the sushi product or products formfittingly rest thereon when the sushi product or products are contained in the box, and its plane-, side-, front-, rear- and cross-sectional shapes are so designed as to conform the sushi product or products. With a view to rendering it easy to put in and to take out the sushi product or products, however, it is preferred that the plastic box for containing a sushi product or products be so formed as to have a top opening having a width and a length which are larger than those of the bottom, i.e., the top opening be so formed as to be broader than the bottom. If the top opening of the box is so formed as to be broader than the bottom as described above, it is rendered easy to put in and to take out the sushi product or products, and yet a space is advantageously formed around the sushi product or products. In the present invention, in a flexible packing bag which is made of a plastic film and microwave-safe, i.e., a flexible microwavable packing bag made of a plastic, a space formed around the sushi product or products in a vacuumed condition advantageously provides interspaces between the sushi product or products and the box and between the box and the packing bag during thawing because volumetric change is slight due to the reduced pressure in the packing bag. In the present invention, in the vacuumed flexible microwavable packing bag made of a plastic film, the interspaces such as those between the box and the sushi product or products and between the box and the packing bag, namely, a space or spaces formed around the sushi product or products, permit water vapor emanating from, for example, a shaped rice section or sections of the frozen sushi product or products by microwave-heating in heating of the frozen sushi product or products in a microwave oven to circulate through the interspaces to heat the shaped rice section or sections and sushi material or materials which are being thawed and at low temperatures. In the present invention, a larger space formed around the sushi product or products undesirably results in a smaller steaming effect, and on the other hand, a smaller space around the sushi product or products undesirably takes a longer time to effect steaming. In the present invention, a size of the space formed around the sushi product or products is equal to or smaller than the volume of the sushi product or products, and when the volume of the sushi product or products is supposed to be 1, the size is 0.1 to 1, preferably 0.2 to 0.6. In the present invention, the volume of the space formed around the sushi product or products in the vacuumed flexible microwavable packing bag made of a plastic film is that derived from subtracting the volume of the box and the volume of the sushi product or products from the volume of the interior of the vacuumed flexible microwavable packing bag made of a plastic. In the present invention, the bottom of the plastic box is a part where the plastic box is brought in contact with the sushi material or materials, and the laminated metal foil is placed thereon. In the present invention, since the laminated metal foil is so provided as to cover the sushi material or materials, electric discharge between the metal foil and walls of a microwave oven or electric discharge between the metal foil and the sushi material or materials can be prevented during thawing in the microwave oven. In the present invention, the plastic-laminated metal foil is provided in such a manner that it covers the sushi material or materials so as to prevent the sushi material or materials from being exposed to microwaves. In the present invention, since the shaped rice section or sections and the sushi material or materials are placed in a plastic bag and hermetically vacuum-packed, when the shaped rice section or sections and the sushi material or materials are once packed, these are optimally protected from entry of ambient air, moisture or bacteria.

In the present invention, when the sushi product or products are thawed, for example, in a microwave oven, thawing of the shaped rice section or sections of the sushi product or products is effected with heat generated by absorption of microwaves with which the portion or sections are irradiated in the microwave oven. Since the sushi material or materials are covered with the laminated metal foil, thawing of the sushi material or materials is effected only with heat and water vapor which are emanating from the shaped rice section or sections of the sushi product or products. Accordingly, in the present invention, although thawing of the packed frozen sushi product or products is dependent upon a weight and a storage temperature of the packed frozen sushi product or products, the thawing is performed, for example, as follows. The frozen packed sushi product or products are subjected to microwave-heating in a microwave oven for 2.5 minutes to 5 minutes to effect thawing of the frozen shaped rice section or sections mainly, and then, without opening the packing bag, the resultant is, for example, allowed to stand for a period of 15 minutes or more, preferably 15 minutes to 1 hour, more preferably 15 to 45 minutes to steam the sushi material or materials with the water vapor emanating from the shaped rice section or sections and to apply the heat of the shaped rice section or sections to the sushi material or materials, whereby thawing of the sushi material or materials is effected In the present invention, in a case where a boxed sushi product or a rod-shaped sushi product is thawed by means of a microwave oven, a temperature distribution in the sushi product heated in the microwave oven was determined. The shaped rice section located at an upper position relative to the sushi material or materials has temperatures higher than the sushi material or materials because of such a positional relationship as to be located at an upper position relative to the sushi material or materials. In the shaped rice section, an upper part has a higher temperature, and parts located nearer to corners have higher temperatures because of concentration of microwave energy. Further, with respect to sides of the shaped rice section, it was found that a side having a smaller area has a temperature higher than that of a side having a larger area. In the case of a rod-shaped sushi product, the rod-shaped sushi product heated by means of a microwave oven is cut into easy-to-eat sized pieces and then served. In this connection, the shaped rice section which has just been thawed has high temperatures, and adhesion between rice grains thereof is strong. This results in difficulty in cutting pieces therefrom, and thus the sushi product is likely to undergo deformation during cutting and lose its original shape. It was found, however, that when the temperatures of the shaped rice section or sections are allowed to lower to those exceeding 10° C. and up to 30° C., preferably those exceeding 15° C. and up to 25° C., the adhesion between the rice grains of the shaped rice section is thereby moderated to enable pieces to be cut from the sushi product with ease.

In the present invention, when a sushi product or products have been thawed by microwave-heating, to make use of residual heat in rice and heat of water vapor for heating a sushi material or materials which remain cool, the resultant is allowed to stand without unpacking to steam the thawed sushi product or products in the packing bag, whereby temperature of the sushi material or materials is raised and, in parallel therewith, temperatures of the shaped rice section or sections are lowered. In the present invention, in the packing bag, a space is formed around the shaped rice section or sections to permit water vapor to flow therethrough during the thawing, whereby steaming is efficiently effected. By virtue of this, in a relatively short period of time, the temperatures of the shaped rice section or sections can be brought to those at which cut pieces are easily separated from the sushi product to render the thawed packed frozen sushi product or products easy to cut into pieces. In the present invention, an inner surface of a top portion of the packing bag and a laminated metal foil, which are respectively in contact with the shaped rice section or sections and the sushi material or materials in a frozen condition, become out of contact therewith and separate therefrom in the thawing to form interspaces, and water vapor flows into the thus formed interspaces to effect steaming and water vapor-heating of the shaped rice section or sections and the sushi material.

In the present invention, the plastic box for containing a sushi product or products is used with a laminated metal foil placed on its bottom and, to permit the interior of the box to be vacuumed, with no covering. The sushi product or products are placed in the box with the sushi material or materials down, i.e., upside down so that the sushi material or materials are in contact with the laminated metal foil. When the sushi product or products are placed in the box with the sushi material or materials down as described above, the sushi material or materials are rested on the laminated metal foil disposed in the bottom of the box to cover a surface or surfaces of the sushi material or materials with the laminated metal foil. On the other hand, the shaped rice section or sections of the sushi product or products contained in the box are placed facing up with no cover thereon in the plastic box. The plastic box in which the sushi product or products are placed in this manner is placed with its top left open in a packing bag made of a flexible plastic film such as a polyethylene/nylon-laminated film. The plastic box which contains the sushi product or products placed therein with the sushi material or materials on the laminated metal foil is placed in the packing bag made of a plastic film as described above, and the packing bag is vacuumed under reduced pressure of 600 mmHg or lower, preferably 400 mmHg or lower. When the packing bag is vacuumed, the bag collapses under atmospheric pressure, and the inner surface of the bag is brought in tight contact with the shaped rice section or sections to enable the sushi product or products to be held fixedly in the box. The covering of the sushi material or materials by means of the laminated metal foil such as a laminated aluminum foil is freeze-immobilized by freezing such as brine freezing subsequent to the vacuum packing, and accordingly, the covering of the sushi material or materials by means of the laminated metal foil undergoes no dislocation during the thawing. In the present invention, since the laminated metal foil such as a laminated aluminum foil which has insulating properties is used, it may be used as it is over the sushi material or materials for screening the sushi material or materials from microwaves. Further, since the flexible packing bag made of a plastic film easily collapses and is brought in tight contact with the sushi product or products to hold the sushi product or products at a fixed position or positions when vacuumed, the position or positions of the sushi product or products are stable and thus the shaped rice section or sections undergo no dislocation relative to the laminated metal foil during freezing or thawing by means of a microwave oven.

According to the present invention, a sushi product or products are so prepared that a shaped rice section or sections are topped with a sushi material or materials, and the thus prepared sushi product or products are so placed with the sushi material or materials down in a box with a laminated metal foil placed on its bottom as to bring the sushi material or materials in contact with the laminated metal foil, and the box which contains the sushi product or products is placed in a flexible plastic packing bag, and the packing bag is vacuumed and hermetically sealed to bring the inner surface of the flexible plastic packing bag in tight contact with the sushi product or products, whereby the sushi product or products contained in the box are fixedly held in the box, and the vacuum packed sushi product or products are exposed to a refrigerant cooled to a freezing temperature to freeze the contents including the sushi product or products in the vacuumed sushi pack. Accordingly, the procedure to prepare the frozen packed sushi product or products may be performed almost mechanically with no substantial manual intervention and thus easily automatized to enable hygienic mass production. Accordingly, frozen packed sushi products of high quality can regularly be produced. Further, in the present invention, the frozen packed sushi product or products may be prepared by topping a shaped rice section or sections with a sushi material or materials to prepare a sushi product or products, placing a laminated metal foil the thus prepared sushi product or products to cover the sushi material or materials, placing the sushi product or products in a plastic box with the laminated metal foil thereon and with the sushi material or materials down, placing the box with the sushi product or products contained therein in a flexible plastic packing bag, vacuuming the packing bag, and freezing the resultant.

Embodiments of the present invention will be described hereinbelow with reference to the accompanying drawings. It should be noted, however, that the present invention is by no means restricted by the following description or Examples.

In Example shown in FIG. 1, a packed frozen sushi product 1 has a plastic packing bag 2 as an outer covering, and a plastic box 4 containing a sushi product 3 is contained in the plastic packing bag 2, and in a condition where the plastic packing bag is vacuumed, the contents including the sushi product 3 as a whole are frozen together in a unified form. In FIG. 1, the sushi product 3 has its left side partially cut off along a cutting line 5, and an end of the cutout of the sushi product 3 is shown in a dash-dotted line 6. In this Example, in order to prevent the sushi material or materials 7 of the sushi product 3 from being heated with microwaves in a microwave oven, the sushi product 3 is placed with its sushi material or materials 7 down in the plastic box 4 on the bottom 8 of which a laminated metal foil 9 is placed. In this Example, the packed frozen sushi product 1 is such that in the plastic packing bag 2, the plastic box 4, the sushi product 3 and the laminated metal foil 9 are frozen together with the plastic packing bag 2 in a unified form. In this Example, the laminated metal foil 9 used in the frozen packed sushi product 1 has its metal foil 10 almost in whole covered with a plastic film 11 and may be prepared by cutting a so-called laminated metal foil 9. In this Example, in the box 4, the sushi product 3 is placed with its sushi material or materials 7, which the sushi material or materials 7 directly contact with the so-called laminated metal foil 9, and with its shaped rice section 12 on the sushi material or materials 7.

In this Example, both side ends 13 and front and rear ends 14 of the sushi material or materials 7 of the sushi product 3 are covered with the laminated metal foil 9. The laminated metal foil 9 is so formed as to have a width and a length which are larger than those of the bottom 8 of the plastic box 4. The laminated metal foil 9 has its front peripheral portions 15 and side peripheral portions 16 upward bent so that these potions upward extend when the laminated metal foil 9 is placed on the bottom 8 of the box 4. The side peripheral portions 15 of the laminated metal foil 9 constitute bent portions 17, and the side peripheral portions 16 constitute bent portion 18. In this Example, the sushi product 3 placed in the plastic box 3 has its side ends 13 of the sushi material or materials 7 covered with the bent portions 17 derived from the side peripheral portions 15 of the laminated metal foil 9 placed on the bottom of the box 4 and has its front and rear peripheral portions 14 of the sushi material or materials 7 covered with the bent portions 18 derived from the side peripheral portions 16 of the laminated metal foil 9 placed on the bottom of the plastic box 4. In thawing by means of a microwave oven, microwaves emitted sideways toward the side ends 13 and the front and rear ends 14 of the sushi material or materials 7 of the sushi product are blocked by the side bent portions 17 and the front and rear bent portions 18 of the laminated metal foil 9 to thereby prevent the sushi material or materials 7 of the sushi product 3 from being heated with the sideward microwaves.

In this Example, in the packed frozen sushi product 1, the laminated metal foil 9 is placed on the bottom 8 of the plastic box 4, and thereon, the sushi product 3 is placed with its sushi material or materials 7 down. After the sushi product 3 is placed in the plastic box 4, the plastic box 4 which contains the sushi product 3 is placed in the flexible plastic packing bag 2. A mouth 19 of the packing bag 2 is connected to a suction port of a vacuum pump (neither of them is shown), and the plastic packing bag 2 is vacuumed under a pressure of, for example, 500 mmHg. After completion of the vacuuming, the mouth 19 of the packing bag 2 is heat-sealed. The sushi product 3 packed and hermetically sealed in the plastic packing bag 2 is soaked, together with the packing bag 2 containing the same, in an ethanol brine refrigerant to freeze the plastic packing bag and its contents en bloc, whereby the packed frozen sushi product 1 in a unified form is prepared.

Since this Example is constructed as described above, the packed frozen sushi product 1 can be thawed in a microwave oven with its shaped rice section 12 up. Alternatively, the packed frozen sushi product may be thawed with the box turned upside down, i.e., with the shaped rice section 12 down and the sushi material or materials 7 up. When thawing is performed in a microwave oven with the shaped rice section 12 up, microwaves from above are mostly absorbed in the shaped rice section and energy thereof is expended substantially in heating the shaped rice section, and the microwaves are thereby prevented from reaching the sushi material or materials and, in substance, the energy thereof is not expended in heating the sushi material or materials 7. In this Example, the laminated metal foil 9 placed on the bottom of the plastic box 4 is formed with the bent portions 17 for the side ends 13 of the sushi material or materials and with the bent portions 18 for the front and rear ends 14 of the sushi material or materials to bock the microwaves emitted sideways relative to the side ends and the front and rear ends of the sushi material or materials 7 of the sushi product 3 by means of the bent portions 17 and 18, whereby the sushi material or materials 7 of the sushi product 3 are prevented from being heated with the sideward microwaves. In this connection, the sideward microwaves are scattered light rays, and besides, the sushi material or materials 7 of the sushi product 3 have small thicknesses, and the rice is present adjacent to the sushi material or materials. Accordingly, the sushi material or materials of the sushi product 3 are not heated to such a degree as to have high temperatures exceeding 10° C. immediately after the thawing. In the following, specific Examples of this Example will be given.

Example 1

1400 ml of seasoned vinegar (sushi vinegar) was added in 13 kg of cooked rice, followed by mixing to uniformly vinegar and the rice. Then, the thus vinegared rice was cooled to 50° C. Using 180 g of the rice vinegared and cooled to 50° C. and 35 g of slices of trout as a sushi material, each of trout-topped boxed sushi products of 5.5 cm in width, 14 cm in length and 3 cm in thickness (S size) was prepared. Each of the boxed sushi products was placed with its slices of trout as a sushi material down in a plastic box on the bottom of which is placed a laminated aluminum foil. In this Example, the laminated aluminum foil used was composed of a polyethylene terephthalate (PET) layer having a thickness of 12 μm as a top layer, and thereunder, an aluminum layer having a thickness of 9 μm, and thereunder, a polypropylene layer as used in a retort pouch and having a thickness of 70 μm, and the laminated aluminum foil measured 6.5 cm in width, and 15.5 cm in length. The box had inner dimensions of 6.5 cm in width and 14.0 cm in length in the bottom, and 7.2 cm in width and 15.7 cm in length in the top opening, and 3.3 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the boxed sushi product had been placed together with the box containing the same and which had been vacuumed and heat-sealed, was kept in ethyl alcohol having a temperature of −35° C. as a brine for 45 minutes and thereby brine-frozen to obtain a packed frozen sushi product. In the packed frozen sushi product, the packing bag as an outer covering and the trout-topped sushi product as contents are frozen together in a unified form. The packed frozen sushi products thus prepared were stored at −19.1° C. on average.

In cooking the packed frozen sushi product, the packed frozen sushi product was placed in a 500 W microwave oven and thawed by applying heat for 2.5 minutes. 2.5 minutes after completion of the thawing, the thawed packed sushi product was removed from the microwave oven and allowed to stand at room temperature for 30 minutes to effect steaming. In this Example, with respect to the exposed rice portion of the thawed sushi product, temperatures of its "upper portion of center of the side of the end portion in the longitudinal direction" (in Table 1, referred to as Upper portion of the side of the end portion of the rice section) and temperatures of its "center portion of the top surface in the longitudinal direction" (in Table 1, referred to as Center portion of the top surface of the rice section) were measured immediately after the thawing, after a lapse of 20 minutes in the steaming, and after a lapse of 30 minutes for the steaming. Also, with respect to the sushi material of the thawed sushi product, temperatures of its "portion 1 cm inner from the end in the longitudinal direction in the aluminum foil-side surface of the sushi material or materials" (in Table 1, referred to as End portion in the aluminum foil-side surface of the sushi material or materials) and temperatures of its "portion 1 cm inner from the end in the longitudinal direction in the rice-side surface of the sushi material or materials" (in Table 1, referred to as End portion of the rice-side surface of the sushi material or materials) were measured immediately after the thawing, after a lapse of 20 minutes in the steaming, and after a lapse of 30 minutes for the steaming. The results are shown in Table 1.

TABLE 1

|  | Temp. ° C. immediately after thawing | post-20 minutes-steaming | post-30 minutes-steaming |
|---|---|---|---|
| Upper portion of the side of the end portion of the rice section | 49.2 | 19.2 | 18.6 |
| Center portion of the top surface of the rice section | 5.6 | 11.4 | 16.7 |
| End portion in the aluminum foil-side surface of the sushi material or materials | −0.8 | 17.8 | 18.2 |
| End portion in the rice-side surface of the sushi material or materials | −1.4 | 18.3 | 18.6 |

As can be seen in Table 1, in the boxed sushi product, although the temperature of the upper portion of the side of the end portion of the rice section was 40 degrees centigrade higher as compared with that of the center portion of the top surface of the rice section immediately after the thawing, these temperatures were within a temperature range of 10 to 20° C. and had reached those at which the sushi product is easy-to-cut with a kitchen knife when the sushi product was steamed for 20 minutes or 20 minutes.

Example 2

In cooking another packed frozen trout-topped boxed sushi product (S size) prepared in Example 1, the packed frozen sushi product was placed in a 500 W microwave oven and thawed by applying heat for 2.5 minutes. 2.5 minutes after completion of the thawing, the defrosted packed sushi product was removed from the microwave oven and allowed to stand at room temperature for 30 minutes to effect steaming. In this Example, with respect to the exposed rice portion of the thawed sushi product, temperatures of its "upper portion of center of the side of the end portion in the longitudinal direction" (in Table 2, referred to as Upper portion of the side of the end portion of the rice section) and temperatures of its "center portion of the top surface in the longitudinal direction" (in Table 2, referred to as Center portion of the top surface of the rice section) were measured immediately after the thawing, after a lapse of 20 minutes in the steaming, and after a lapse of 30 minutes for the steaming. Also, with respect to the sushi material of the thawed sushi product, temperatures of its end portion in the aluminum foil-side surface of the sushi material or materials (in Table 2, referred to as End portion in the aluminum foil-side surface of the sushi material or materials) and temperatures of its "portion 1 cm inner from the end in the longitudinal direction in the rice-side surface of the sushi material or materials" (in Table 2, referred to as End portion of the rice-side surface of the sushi material or materials) were measured immediately after the thawing, after a lapse of 20 minutes in the steaming, and after a lapse of 30 minutes for the steaming. The results are shown in Table 2.

TABLE 2

|  | Temp. ° C. immediately after thawing | post-20 minutes- steaming | post-30 minutes- steaming |
| --- | --- | --- | --- |
| Upper portion of the side of the end portion of the rice section | 50.8 | 21.0 | 20.3 |
| Center portion of the top surface of the rice section | 5.2 | 9.3 | 12.8 |
| End portion in the aluminum foil-side surface of the sushi material or materials | −0.5 | 18.4 | 18.6 |
| End portion of the rice-side surface of the sushi material or materials | −1.0 | 18.9 | 19.5 |

As can be seen in Table 2, in the boxed sushi product, although the temperature of the upper portion of the side of the end portion of the rice section was approximately 50° C. higher as compared with that of the Center portion of the top surface of the rice section immediately after the thawing, these temperatures were within a temperature range of about 10 to about 20° C. and had reached those at which the sushi product may be cut easily with a kitchen knife when the sushi product was steamed for 20 minutes or 20 minutes.

Example 3

105 g of the rice vinegared and cooled to 50° C. in Example 1 was topped with 105 g of a boned, lightly salted and marinated fillet of mackerel as a sushi material, and thereon, with 7 g of a thin slice of kombu kelp (shiroita kombu) cooked in a broth seasoned with vinegar, sugar and salt and then cooled to prepare each of mackerel-topped boxed sushi products of 5.5 cm in width, 14 cm in length and 3 cm in thickness (S size). Each of the boxed sushi products was placed with its sushi materials down in a plastic box on the bottom of which is placed a laminated aluminum foil. In this Example, the laminated aluminum foil used was composed of a polyethylene terephthalate (PET) layer having a thickness of 12 μm as a top layer, and thereunder, an aluminum layer having a thickness of 9 μm, and thereunder, a polypropylene layer as used in a retort pouch and having a thickness of 70 μm, and the laminated aluminum foil measured 6.5 cm in width, and 15.5 cm in length. The box had inner dimensions of 6.5 cm in width and 14.0 cm in length in the bottom, and 7.2 cm in width and 15.7 cm in length in the top opening, and 3.3 cm in depth. In the same manner as in Examples 1 and 2, the box which contained the boxed sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the boxed sushi product had been placed together with the box containing the same and which had been vacuumed and heat-sealed, was kept in ethyl alcohol having a temperature of −35° C. as a brine for 45 minutes and thereby brine-frozen to obtain a packed frozen sushi product. In the packed frozen sushi product, the packing bag as an outer covering and the contents are frozen together in a unified form. The packed frozen sushi products thus prepared were stored in an insulated storage at −16.6° C. on average.

In cooking the packed frozen sushi product, thawing was performed by means of a 500 W microwave oven. The packed frozen sushi product was placed in the microwave oven and thawed by applying heat for 2.5 minutes. 2.5 minutes after completion of the thawing, the thawed packed sushi product was removed from the microwave oven and allowed to stand at room temperature for 30 minutes to effect steaming. In this Example, with respect to the exposed rice portion of the thawed sushi product, temperatures of its "upper portion of center of the side of the end portion in the longitudinal direction" (in Table 3, referred to as Upper portion of the side of the end portion of the rice section) and temperatures of its "center portion of the top surface in the longitudinal direction" (in Table 3, referred to as Center portion of the top surface of the rice section) were measured immediately after the thawing, after a lapse of 20 minutes in the steaming, and after a lapse of 30 minutes for the steaming. Also, with respect to the sushi material of the thawed sushi product, temperatures of its "portion 1 cm inner from the end in the longitudinal direction in the aluminum foil-side surface of the sushi material or materials" (in Table 3, referred to as End portion in the aluminum foil-side surface of the sushi material or materials) and temperatures of its "portion 1 cm inner from the end in the longitudinal direction in the rice-side surface of the sushi material or materials" (in Table 3, referred to as End portion of the rice-side surface of the sushi material or materials) were measured immediately after the thawing, after a lapse of 20 minutes in the steaming, and after a lapse of 30 minutes for the steaming. The results are shown in Table 3.

TABLE 3

|  | Temp. ° C. immediately after thawing | post-20 minutes- steaming | post-30 minutes- steaming |
| --- | --- | --- | --- |
| Upper portion of the side of the end portion of the rice section | 49.2 | 22.3 | 19.8 |
| Center portion of the top surface of the rice section | 2.0 | 5.4 | 9.2 |
| End portion in the aluminum foil-side surface of the sushi material or materials | −1.6 | 17.2 | 18.1 |
| End portion of the rice-side surface of the sushi material or materials | −2.9 | 11.3 | 13.6 |

As can be seen in Table 3, in the boxed sushi product, although the temperature of the upper portion of the side of the end portion of the rice section was about 47° C. higher as compared with that of the center portion of the top surface of the rice section immediately after the thawing, these temperatures were within a temperature range of about 10 to about 20° C. and had reached those at which the sushi product is easy-to-cut with a kitchen knife when the sushi product was steamed for 30 minutes.

Example 4

In cooking another packed frozen mackerel-topped boxed sushi product (S size) prepared in Example 3, thawing was performed by means of a 500 W microwave oven. The packed frozen sushi product was placed in the microwave oven and thawed by applying heat for 2.5 minutes. 2.5 minutes after completion of the thawing, the defrosted packed sushi product was removed from the microwave oven and allowed to stand at room temperature for 30 minutes to effect steaming. In this Example, with respect to the exposed rice portion of the thawed sushi product, temperatures of its "upper portion of center of the side of the end portion in the longitudinal direction" (in Table 4, referred to as Upper portion of the side of the end portion of the rice section) and temperatures of its "center portion of the top surface in the longitudinal direction" (in Table 4, referred to as Center portion of the top surface of the rice section) were measured immediately after the thawing, after a lapse of 20 minutes in the steaming, and after a lapse of 30 minutes for the steaming. Also, with respect to the sushi material of the thawed sushi product, temperatures of its "portion 1 cm inner from the end in the longitudinal direction in the aluminum foil-side surface of the sushi material or materials" (in Table 4, referred to as End portion in the aluminum foil-side surface of the sushi material or materials) and temperatures of its "portion 1 cm inner from the end in the longitudinal direction in the rice-side surface of the sushi material or materials" (in Table 4, referred to as End portion of the rice-side surface of the sushi material or materials) were measured immediately after the thawing, after a lapse of 20 minutes in the steaming, and after a lapse of 30 minutes for the steaming. The results are shown in Table 4.

TABLE 4

|  | Temp. ° C. immediately after thawing | post-20 minutes-steaming | post-30 minutes-steaming |
| --- | --- | --- | --- |
| Upper portion of the side of the end portion of the rice section | 48.7 | 21.6 | 19.2 |
| Center portion of the top surface of the rice section | 1.6 | 4.7 | 8.8 |
| End portion in the aluminum foil-side surface of the sushi material or materials | −1.3 | 16.6 | 16.8 |
| End portion of the rice-side surface of the sushi material or materials | −3.1 | 10.1 | 12.0 |

As can be seen in Table 4, in the boxed sushi product, although the temperature of the upper portion of the side of the end portion of the rice section was approximately 47° C. higher as compared with that of the center portion of the top surface of the rice section immediately after the thawing, these temperatures were within a temperature range of about 10 to about 20° C. and had reached those at which the sushi product may be cut easily with a kitchen knife when the sushi product was steamed for 30 minutes.

Example 5

1400 ml of seasoned vinegar (sushi vinegar) was added in 13 kg of cooked rice, followed by mixing to uniformly vinegar the rice. Then, the thus vinegared rice was cooled to 50° C. 240 g of the rice vinegared and cooled to 50° C. was topped with 125 g of a boned, lightly salted and marinated fillet of mackerel as a sushi material, and thereon, with 8 g of a thin slice of kombu kelp (shiroita kombu) cooked in a broth seasoned with vinegar, sugar and salt and then cooled to prepare each of mackerel-topped boxed sushi products of 5.5 cm in width, 18 cm in length and 4.2 cm in thickness (L size). Each of the boxed sushi products was placed with its sushi materials down in a plastic box on the bottom of which is placed a laminated aluminum foil. In this Example, the laminated aluminum foil used was composed of a polyethylene terephthalate (PET) layer having a thickness of 12 μm as a top layer, and thereunder, an aluminum layer having a thickness of 9 μm, and thereunder, a polypropylene layer as used in a retort pouch and having a thickness of 70 μm, and the laminated aluminum foil measured 6.5 cm in width, and 19.5 cm in length. The box had inner dimensions of 6.0 cm in width and 19.2 cm in length in the bottom, and 7.0 cm in width and 20.5 cm in length in the top opening, and 3.3 cm in depth. The box which contained the boxed sushi product was placed in a packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the boxed sushi product had been placed together with the box containing the same and which had been vacuumed and heat-sealed, was kept in ethyl alcohol having a temperature of −35° C. as a brine for 45 minutes and thereby brine-frozen to obtain a packed frozen sushi product. In the packed frozen sushi product, the packing bag as an outer covering and the contents are frozen together in a unified form. The packed frozen sushi products thus prepared were stored in an insulated storage at −18.6° C. on average.

In cooking the packed frozen sushi product, thawing was performed by means of a 500 W microwave oven. The packed frozen sushi product was placed in the microwave oven and thawed by applying heat for 4.5 minutes. 4.5 minutes after (completion of) the thawing, the thawed packed sushi product was removed from the microwave oven and allowed to stand at room temperature for 30 minutes to effect steaming. In this Example, with respect to the exposed rice portion of the thawed sushi product, temperatures of its "upper portion of center of the side of the end portion in the longitudinal direction" (in Table 5, referred to as Upper portion of the side of the end portion of the rice section) and temperatures of its "center portion of the top surface in the longitudinal direction" (in Table 5, referred to as Center portion of the top surface of the rice section) were measured immediately after the thawing, after a lapse of 20 minutes in the steaming, and after a lapse of 30 minutes for the steaming. Also, with respect to the sushi material of the thawed sushi product, temperatures of its "portion 1 cm inner from the end in the longitudinal direction in the aluminum foil-side surface of the sushi material or materials" (in Table 5, referred to as End portion in the aluminum foil-side surface of the sushi material or materials) and temperatures of its "portion 1 cm inner from the end in the longitudinal direction in the rice-side surface of the sushi material or materials" (in Table 5, referred to as End portion of the rice-side surface of the sushi material or materials)

were measured immediately after the thawing, after a lapse of 20 minutes in the steaming, and after a lapse of 30 minutes for the steaming. The results are shown in Table 5.

TABLE 5

| | Temp. °C. immediately after thawing | post-20 minutes-steaming | post-30 minutes-steaming |
|---|---|---|---|
| Upper portion of the side of the end portion of the rice section | 48.2 | 19.1 | 17.7 |
| Center portion of the top surface of the rice section | 4.6 | 11.6 | 15.0 |
| End portion in the aluminum foil-side surface of the sushi material or materials | −2.5 | 16.3 | 17.0 |
| End portion of the rice-side surface of the sushi material or materials | −3.1 | 15.1 | 16.3 |

As can be seen in Table 5, in the boxed sushi product, although the temperature of the upper portion of the side of the end portion of the rice section was about 43° C. higher as compared with that of the center portion of the top surface of the rice section immediately after the thawing, these temperatures were within a temperature range of 10 to 20° C. and had reached those at which the sushi product is easy-to-cut with a kitchen knife when the sushi product was steamed for 20 minutes or 30 minutes.

Example 6

1400 ml of seasoned vinegar (sushi vinegar) was added in 13 kg of cooked rice, followed by mixing to uniformly vinegar the rice. Then, the thus vinegared rice was cooled to 50° C. 180 g of the rice vinegared and cooled to 50° C. was topped with 40 g of boiled, lightly salted and marinated 4 sticks of leg meat of queen crab (zuwai-gani) as a sushi material was placed to prepare each of queen crab meat-topped boxed sushi products of 5.5 cm in width, 14 cm in length and 2.9 cm in thickness (S size) Each of the boxed sushi products was placed with its sushi material down in a plastic box on the bottom of which is placed a laminated aluminum foil. In this Example, the laminated aluminum foil used was composed of a polyethylene terephthalate (PET) layer having a thickness of 12 μm as a top layer, and thereunder, an aluminum layer having a thickness of 9 μm, and thereunder, a polypropylene layer as used in a retort pouch and having a thickness of 70 μm, and the laminated aluminum foil measured 6.5 cm in width, and 15.5 cm in length. The box had inner dimensions of 6.5 cm in width and 14.0 cm in length in the bottom, and 7.2 cm in width and 15.7 cm in length in the top opening, and 3.3 cm in depth. The box which contained the boxed sushi product was placed in a packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the boxed sushi product had been placed together with the box containing the same and which had been vacuumed and heat-sealed, was kept in ethyl alcohol having a temperature of −35° C. as a brine for 45 minutes and thereby brine-frozen to obtain a packed frozen sushi product. In the packed frozen sushi product, the packing bag as an outer covering and the contents are frozen together in a unified form. The packed frozen sushi products thus prepared were stored in an insulated storage at −20.3° C. on average.

In cooking the packed frozen sushi product, thawing was performed by means of a 500 W microwave oven. The packed frozen sushi product was placed in the microwave oven and thawed by applying heat for 2.5 minutes. 2.5 minutes after (completion of) the thawing, the thawed packed sushi product was removed from the microwave oven and allowed to stand at room temperature for 30 minutes to effect steaming. In this Example, with respect to the exposed rice portion of the thawed sushi product, temperatures of its "upper portion of center of the side of the end portion in the longitudinal direction" (in Table 6, referred to as Upper portion of the side of the end portion of the rice section) and temperatures of its "center portion of the top surface in the longitudinal direction" (in Table 6, referred to as Center portion of the top surface of the rice section) were measured immediately after the thawing, after a lapse of 20 minutes in the steaming, and after a lapse of 30 minutes for the steaming. Also, with respect to the sushi material of the thawed sushi product, temperatures of its "portion 1 cm inner from the end in the longitudinal direction in the aluminum foil-side surface of the sushi material or materials" (in Table 6 referred to as End portion in the aluminum foil-side surface of the sushi material or materials) and temperatures of its "portion 1 cm inner from the end in the longitudinal direction in the rice-side surface of the sushi material or materials" (in Table 6, referred to as End portion of the rice-side surface of the sushi material or materials) were measured immediately after the thawing, after a lapse of 20 minutes in the steaming, and after a lapse of 30 minutes for the steaming. The results are shown in Table 6.

TABLE 6

| | Temp. °C. immediately after thawing | Post-20 minutes-steaming | post-30 minutes-steaming |
|---|---|---|---|
| Upper portion of the side of the end portion of the rice section | 50.8 | 18.6 | 18.3 |
| Center portion of the top surface of the rice section | 15.2 | 13.2 | 14.2 |
| End portion in the aluminum foil-side surface of the sushi material or materials | −1.6 | 11.2 | 16.6 |
| End portion of the rice-side surface of the sushi material or materials | −3.8 | 13.8 | 16.3 |

As can be seen in Table 6, in the boxed sushi product, although the temperature of the upper portion of the side of the end portion of the rice section was about 43° C. higher as compared with that of the center portion of the top surface of the rice section immediately after the thawing, these temperatures were within a temperature range of 10 to 20° C. and had reached those at which the sushi product is easy-to-cut with a kitchen knife when the sushi product was steamed for 20 minutes or 30 minutes.

Example 7

In cooking another packed frozen mackerel-topped boxed sushi product (S size) in the preceding Example, thawing was performed by means of a 500 W microwave oven. The packed frozen sushi product was placed in the microwave oven and thawed by applying heat for 2.5 minutes. 2.5 minutes after completion of the thawing, the defrosted packed sushi product was removed from the microwave oven and allowed to stand at room temperature for 30 minutes to effect steaming. In this Example, with respect to the exposed rice portion of the thawed sushi product, temperatures of its "upper portion of center of the side of the end portion in the longitudinal direction" (in Table 7, referred to as Upper portion of the side of the end portion of the rice section) and temperatures of its "center portion of the top surface in the longitudinal direction" (in Table 7, referred to as Center portion of the top surface of the rice section) were measured immediately after the thawing, after a lapse of 20 minutes in the steaming, and after a lapse of 30 minutes for the steaming. Also, with respect to the sushi material of the thawed sushi product, temperatures of its "portion 1 cm inner from the end in the longitudinal direction in the aluminum foil-side surface of the sushi material or materials" (in Table 7, referred to as End portion in the aluminum foil-side surface of the sushi material or materials) and temperatures of its "portion 1 cm inner from the end in the longitudinal direction in the rice-side surface of the sushi material or materials" (in Table 7, referred to as End portion of the rice-side surface of the sushi material or materials) were measured immediately after the thawing, after a lapse of 20 minutes in the steaming, and after a lapse of 30 minutes for the steaming. The results are shown in Table 7.

TABLE 7

|  | Temp. ° C. immediately after thawing | Post-20 minutes-steaming | post-30 minutes-steaming |
| --- | --- | --- | --- |
| Upper portion of the side of the end portion of the rice section | 50.4 | 19.8 | 18.6 |
| Center portion of the top surface of the rice section | 14.4 | 12.0 | 13.5 |
| End portion in the aluminum foil-side surface of the sushi material or materials | −1.2 | 11.7 | 17.6 |
| End portion of the rice-side surface of the sushi material or materials | −3.5 | 13.9 | 17.2 |

As can be seen in Table 7, in the boxed sushi product, although the temperature of the upper portion of the side of the end portion of the rice section was 36° C. higher as compared with that of the center portion of the top surface of the rice section immediately after the thawing, these temperatures were within a temperature range of about 10 to about 20° C. and had reached those at which the sushi product may be cut easily with a kitchen knife when the sushi product was steamed for 20 minutes or 30 minutes.

Figure 2:
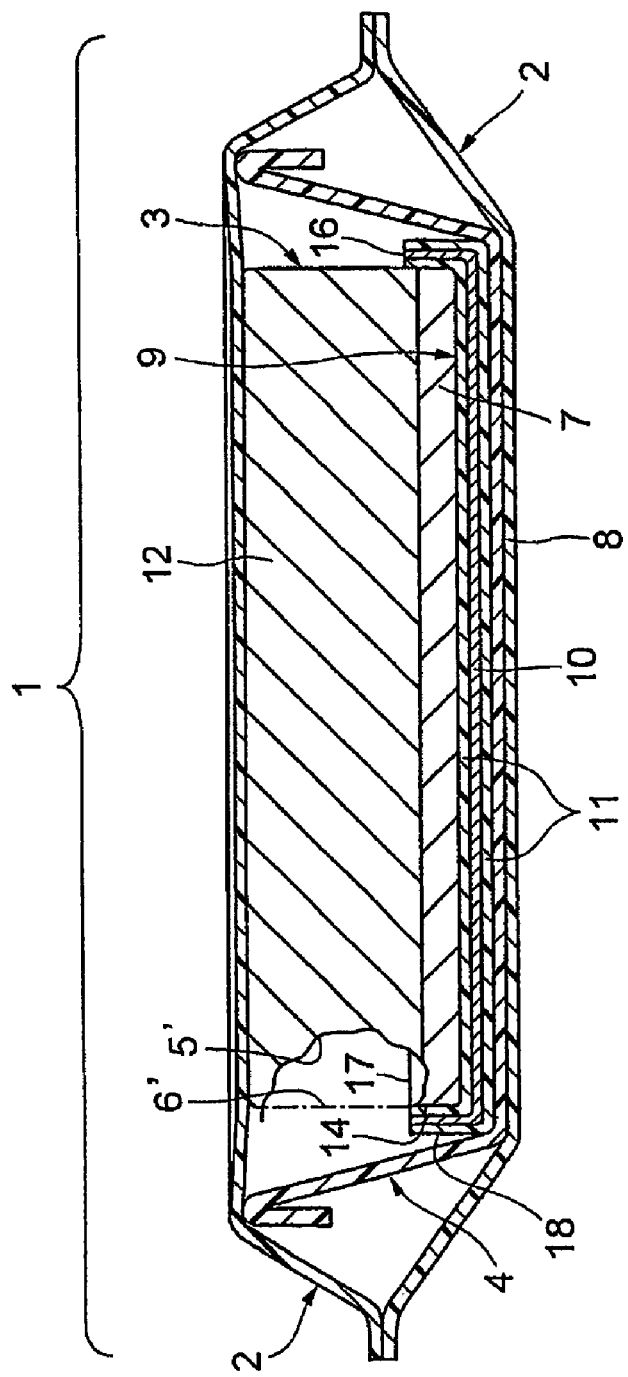
FIG. 2 is a schematic side sectional view schematically illustrating Example shown in FIG. 1.
Figure 3:
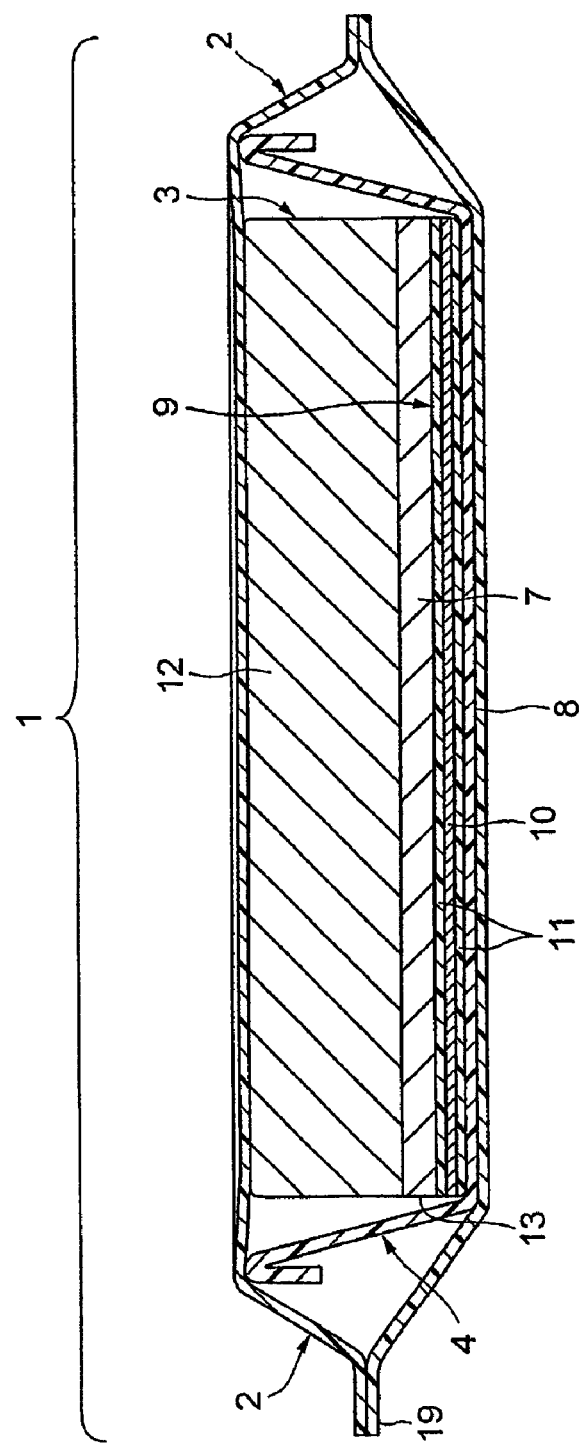
FIG. 3 is a schematic front sectional view schematically illustrating another Example of the present invention which is different from Example shown in FIGS. 1 and 2.

In Example shown in FIG. 3, as in Examples shown in FIGS. 1 and 2, a packed frozen sushi product 1 has a plastic packing bag 2 as an outer covering, and a plastic box 4 containing a sushi product 3 is contained in the plastic packing bag 2, and in a condition where the plastic packing bag is vacuumed, the contents including the sushi product 3 as a whole are frozen together in a unified form. In this Example, in order to shield a sushi material or materials 7 of the sushi product from microwaves emitted in a microwave oven by means of a laminated metal foil 9 and to thereby prevent the sushi material or materials 7 of the sushi product 3 from being heated with the microwaves during thawing of the sushi product 3 in a microwave oven, the sushi product 3 is placed with its sushi material or materials 7 down on the laminated metal foil 9 placed on the bottom 8 of the plastic box 4. In this Example, the packed frozen sushi product 1 is such that in the plastic packing bag 2, the plastic box 4, the sushi product 3 and the laminated metal foil 9 are frozen together with the plastic packing bag 2 in a unified form. In this Example, in the laminated metal foil 9 used in the frozen packed sushi product 1, its metal foil 10 is in whole covered with a plastic film 11 to form a so-called laminated metal foil 9. This Example is different form Examples shown in FIGS. 1 and 2 in that the laminated metal foil 9 is provided with no bent portions 17 or 20 in its side peripheral portions and front and rear peripheral portions. With respect to other features, this Example is the same as Examples shown in FIGS. 1 and 2.

In this Example, in the packed frozen sushi product 1, the laminated metal foil 9 is placed on the bottom 7 of the plastic box 4, and thereon, the sushi product 3 is placed with its sushi material or materials 7 down. After the sushi product 3 is placed in the plastic box 4, the plastic box 4 which contains the sushi product 3 is placed in the flexible plastic packing bag 2. A mouth 21 of the packing bag is connected to a suction port of a vacuum pump (neither of them is shown), and the plastic packing bag 2 is vacuumed under a pressure of, for example, 500 mmHg or lower. After completion of the vacuuming, the mouth 11 of the packing bag is heat-sealed. The sushi product packed and hermetically sealed in the plastic packing bag is soaked, together with the packing bag containing the same, in an ethanol brine refrigerant to freeze the plastic packing bag and its contents en bloc, whereby the packed frozen sushi product 1 in a unified form is prepared.

Since this Example is constructed as described above, the packed frozen sushi product 1 can be thawed in a microwave oven with its shaped rice section 12 up. Alternatively, the packed frozen sushi product may be thawed with the shaped rice section 12 down and the sushi material or materials 5 up. When thawing is performed in a microwave oven with the shaped rice section 10 up, microwaves from above are mostly absorbed in the shaped rice section and energy thereof is expended substantially in heating the shaped rice section, and the microwaves are thereby prevented from reaching the sushi material or materials of the sushi product and, in substance, the energy thereof is not expended in heating the sushi material or materials 7 of the sushi product 3. In this connection, the sideward microwaves are scattered light rays, and besides, the sushi material or materials 7 of the sushi product 3 have small thicknesses and thus sectional areas derived form the thicknesses are small which are irradiated with the microwaves, and the rice is present adjacent to the sushi material or materials. Accordingly, the sushi material or materials of the sushi product 3 are not heated to such a degree as to have high temperatures exceeding 10° C. immediately after the thawing. In the following, specific Examples of this Example will be given.

Example 8

1400 ml of seasoned vinegar (sushi vinegar) was added in 13 kg of cooked rice, followed by mixing to uniformly vinegar the rice. Then, the thus vinegared rice was cooled to 50° C. Using 240 g of the rice vinegared and cooled to 50° C. and 40 g of slices of trout as a sushi material, each of trout-topped boxed sushi products of 5.5 cm in width, 18 cm in length and 3 cm in thickness (L size) was prepared. Each of the boxed sushi products was placed with the slices of trout as a sushi material down in a plastic box on the bottom of which is placed a laminated aluminum foil. In this Example, the laminated aluminum foil used was composed of a polyethylene terephthalate (PET) layer having a thickness of 12 μm as a top layer, and thereunder, an aluminum layer having a thickness of 9 μm, and thereunder, a polypropylene layer as used in a retort pouch and having a thickness of 70 μm, and the laminated aluminum foil had substantially the same size as the bottom of the box and measured approximately 6 cm in width, and approximately 19.2 cm in length. In this Example, the box had inner dimensions of 6.0 cm in width and 19.2 cm in length in the bottom, and 7.0 cm in width and 20.5 cm in length in the top opening, and 3.3 cm in depth. The box which contained the sushi product was placed in a flexible packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the boxed sushi product had been placed together with the box containing the same and which had been vacuumed and heat-sealed, was kept in ethyl alcohol having a temperature of −35° C. as a brine for 45 minutes and thereby brine-frozen to obtain a packed frozen sushi product. In the packed frozen sushi product, the packing bag as an outer covering and the contents including the trout-topped sushi product are frozen together in a unified form. The packed frozen sushi products thus prepared were stored at −19.2° C. on average.

In cooking the packed frozen sushi product, thawing was performed by means of a 500 W microwave oven. The packed frozen sushi product was placed in the microwave oven and thawed by applying heat for 2.5 minutes. 4.5 minutes after (completion of) the thawing, the thawed packed (frozen) sushi product was removed from the microwave oven and allowed to stand at room temperature for 30 minutes to effect steaming. In this Example, with respect to the exposed rice portion of the thawed sushi product, temperatures of its "upper portion of center of the side of the end portion in the longitudinal direction" (in Table 8, referred to as Upper portion of the side of the end portion of the rice section) and temperatures of its "center portion of the top surface in the longitudinal direction" (in Table 8, referred to as Center portion of the top surface of the rice section) were measured immediately after the thawing, after a lapse of 20 minutes in the steaming, and after a lapse of 30 minutes for the steaming. Also, with respect to the sushi material of the thawed sushi product, temperatures of its end portion in the aluminum foil-side surface of the sushi material or materials (in Table 8 referred to as End portion in the aluminum foil-side surface of the sushi material or materials) and temperatures of its "portion 1 cm inner from the end in the longitudinal direction in the rice-side surface of the sushi material or materials" (in Table 8, referred to as End portion of the rice-side surface of the sushi material or materials) were measured immediately after the thawing, after a lapse of 20 minutes in the steaming, and after a lapse of 30 minutes for the steaming. The results are shown in Table 8.

TABLE 8

|  | Temp. ° C. immediately after thawing | Post-20 minutes-steaming | post-30 minutes-steaming |
| --- | --- | --- | --- |
| Upper portion of the side of the end portion of the rice section | 50.4 | 27.3 | 24.2 |
| Center portion of the top surface of the rice section | 13.3 | 18.8 | 21.6 |
| End portion in the aluminum foil-side surface of the sushi material or materials | 4.2 | 20.1 | 21.4 |
| End portion of the rice-side surface of the sushi material or materials | 2.0 | 18.6 | 20.8 |

As can be seen in Table 8, in the boxed sushi product, although the temperature of the upper portion of the side of the end portion of the rice section was about 37° C. higher as compared with that of the Center portion of the top surface of the rice section immediately after the thawing, these temperatures were within a temperature range of 10 to 20° C. and had reached those at which the sushi product is easy-to-cut with a kitchen knife when the sushi product was steamed for 20 minutes or 30 minutes.

Example 9

240 g of the rice vinegared and cooled to 50° C. in Example 1 was topped with 50 g of boiled, lightly salted and marinated 5 sticks of leg meat of queen crab (zuwai-gani) as a sushi material was placed to prepare each of queen crab (meat)-topped boxed sushi products of 5.5 cm in width, 18 cm in length and 2.9 cm in thickness (L size) Each of the boxed sushi products was placed with its sushi material down in a plastic box on the bottom of which is placed a laminated aluminum foil. In this Example, the laminated aluminum foil used was composed of a polyethylene terephthalate (PET) layer having a thickness of 12 μm as a top layer, and thereunder, an aluminum layer having a thickness of 9 μm, and thereunder, a polypropylene layer as used in a retort pouch and having a thickness of 70 μm, and the laminated aluminum foil had substantially the same size as the bottom of the box and measured approximately 6 cm in width, and approximately 19.2 cm in length. In this Example, the box had inner dimensions of 6 cm in width and 19.2 cm in length in the bottom, and 7.0 cm in width and 20.5 cm in length in the top opening, and 3.3 cm in depth. As in Examples 1 to 5, the box which contained the boxed sushi product was placed in a packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section.

The packing bag, in which the boxed sushi product had been placed together with the box containing the same and which had been vacuumed and heat-sealed, was kept in ethyl alcohol having a temperature of −35° C. as a brine for 45 minutes and thereby brine-frozen to obtain a packed frozen sushi product. In the packed frozen sushi product, the packing bag as an outer covering and the contents are frozen together in a unified form. The packed frozen sushi products thus prepared were stored in an insulated storage at −20.8° C. on average.

In cooking the packed frozen sushi product, thawing was performed by means of a 500 W microwave oven. The packed frozen sushi product was placed in the microwave oven and thawed by applying heat for 4.25 minutes. 4.25 minutes after (completion of) the thawing, the thawed packed sushi product was removed from the microwave oven and allowed to stand at room temperature for 30 minutes to effect steaming. In this Example, with respect to the exposed rice portion of the thawed sushi product, temperatures of its "upper portion of center of the side of the end portion in the longitudinal direction" (in Table 9, referred to as Upper portion of the side of the end portion of the rice section) and temperatures of its "center portion of the top surface in the longitudinal direction" (in Table 9, referred to as Center portion of the top surface of the rice section) were measured immediately after the thawing, after a lapse of 20 minutes in the steaming, and after a lapse of 30 minutes for the steaming. Also, with respect to the sushi material of the thawed sushi product, temperatures of its "portion 1 cm inner from the end in the longitudinal direction in the aluminum foil-side surface of the sushi material or materials" (in Table 9 referred to as End portion in the aluminum foil-side surface of the sushi material or materials) and temperatures of its "portion 1 cm inner from the end in the longitudinal direction in the rice-side surface of the sushi material or materials" (in Table 9, referred to as End portion of the rice-side surface of the sushi material or materials) were measured immediately after the thawing, after a lapse of 20 minutes in the steaming, and after a lapse of 30 minutes for the steaming. The results are shown in Table 9.

TABLE 9

|  | Temp. ° C. immediately after thawing | Post-20 minutes-steaming | post-30 minutes-steaming |
| --- | --- | --- | --- |
| Upper portion of the side of the end portion of the rice section | 54.7 | 33.9 | 29.6 |
| Center portion of the top surface of the rice section | 22.2 | 21.6 | 21.6 |
| End portion in the aluminum foil-side surface of the sushi material or materials | 4.3 | 15.8 | 22.7 |
| End portion of the rice-side surface of the sushi material or materials | 1.9 | 13.9 | 22.3 |

As can be seen in Table 9, in the boxed sushi product, the temperature of the upper portion of the side of the end portion of the rice section was about 32° C. higher as compared with that of the center portion of the top surface of the rice section and the sushi material had temperatures lower than 5° C., immediately after the thawing. When the sushi product was steamed for 30 minutes, however, the sushi product totally had temperatures higher than 20° C. and differences between the temperatures were within a range of less than 10° C. and accordingly, the temperatures had reached those at which the sushi product is in good condition to eat and easy-to-cut with a kitchen knife.

Figure 4:
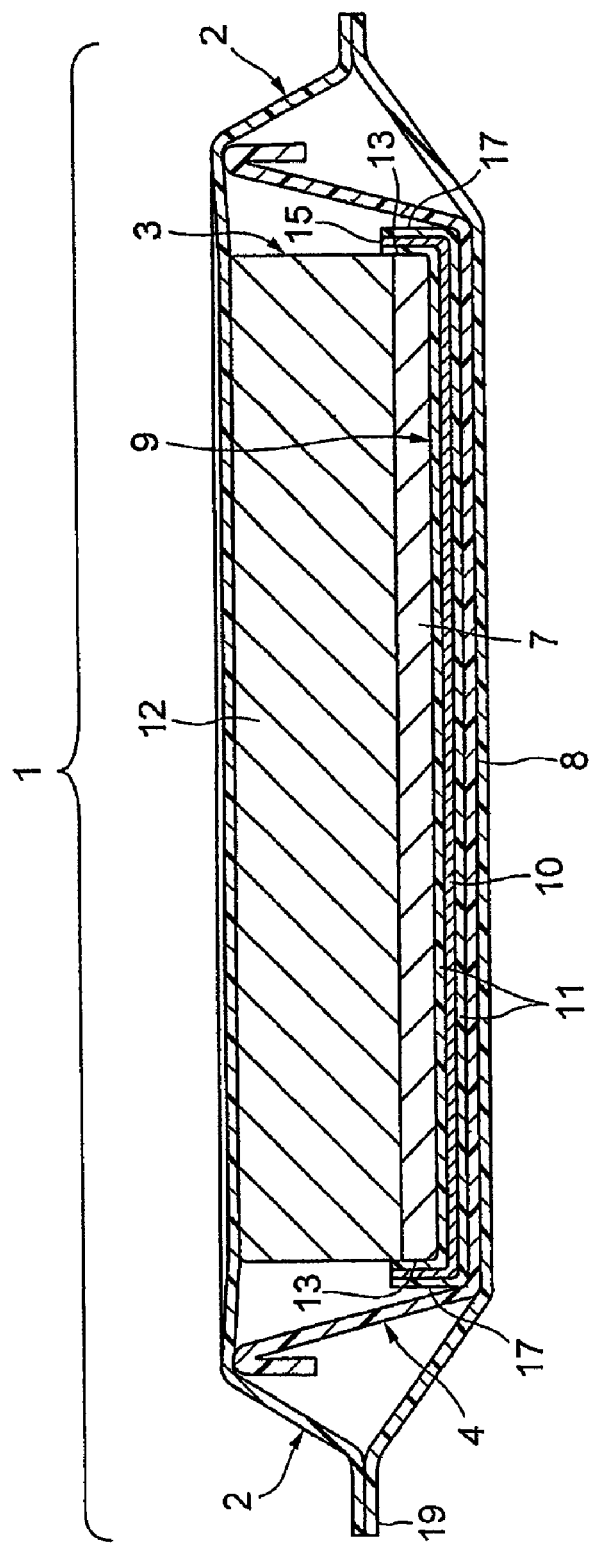
FIG. 4 is a schematic front sectional view schematically illustrating still another Example of the present invention which is different from Example shown in FIGS. 1 to 3.

Example shown in FIG. 4 is an illustrative example where in view of the fact that temperatures of (front and rear) ends of a sushi product are considerably elevated as compared with that of a center portion by heating of the sushi product by means of a microwave oven, in order to cover both ends of a sushi material or materials 7 of the sushi product 3, i.e., front and rear ends 13 of the sushi material or materials of the sushi product with a laminated metal foil 6, the laminated metal foil 6 is so formed as to have a longitudinal dimension larger than that of a bottom of a plastic box 4, and when the laminated metal foil is placed on the bottom of the plastic box 4, front and rear peripheral portions 15 of the laminated metal foil 9 are upward bent along front and rear walls 16 of the plastic box to form bent portions 17 of the laminated metal foil 9. This Example is different from Examples shown in FIGS. 1 to 3 in this point. With respect to other features, however, this Example is the same as Examples shown in FIGS. 1 to 3. In this Example, when the sushi product 3 is placed in the plastic box, the front and rear ends 13 of the sushi material or materials 7 of the sushi product 3 are covered with the bent portions 17 derived from the front and rear peripheral portions 15 of the laminated metal foil 9 placed on the bottom of the plastic box. In consequence, microwaves sideways emitted toward the front and rear ends of the sushi material or materials 7 are blocked by the bent portions 17 to prevent the front and rear ends of the sushi material or materials 5 from being heated by the sideward microwaves.

Figure 5:
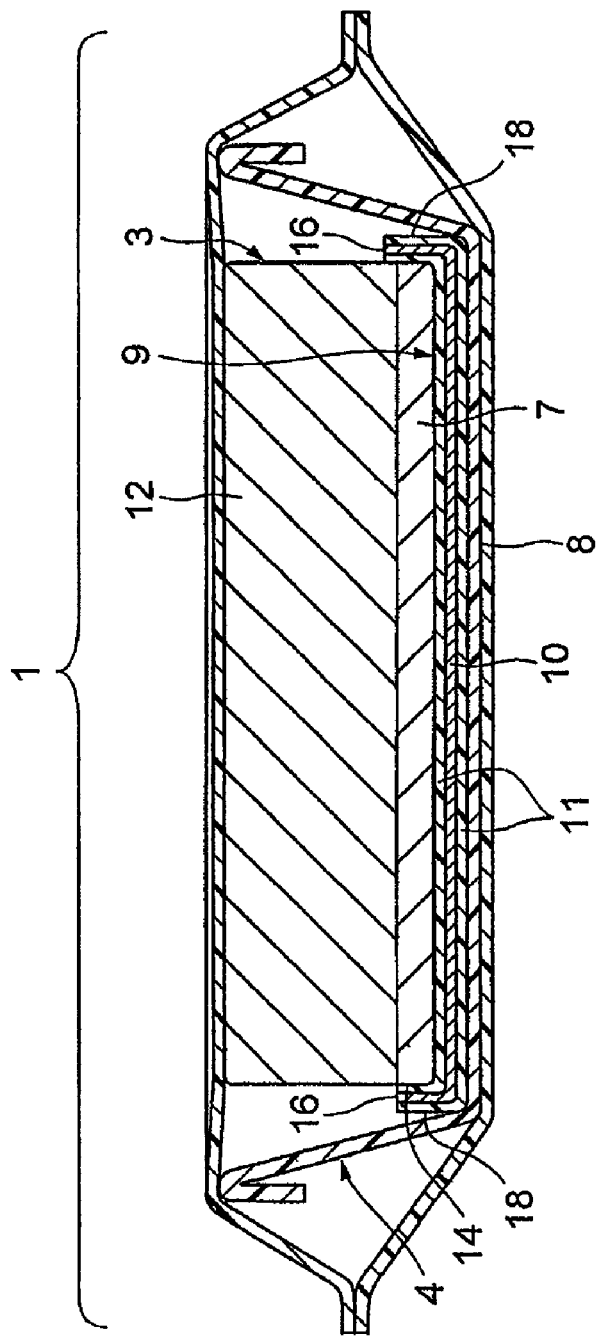
FIG. 5 is a schematic side sectional view schematically illustrating a further Example of the present invention which is different from Example shown in FIGS. 1 to 4.

Example shown in FIG. 5 is an illustrative example where when the laminated metal foil is placed on a bottom of a plastic box 4, side peripheral portions 18 of the laminated metal foil 6 are upward bent along side walls 19 of the plastic box to form bent portions 20 in the sides of the laminated metal foil 9. With exception of this point, this Example is the same as Example shown in FIG. 1 in other features. In this Example, when a sushi product 3 is placed in the plastic box 4, side ends 14 of a sushi material or materials 7 of the sushi product 3 are covered with the side bent portions 20 derived from the side peripheral portions 18 of the laminated metal foil 9 placed on the bottom 8 of the plastic box 4. In consequence, microwaves sideways emitted toward the side ends 14 of the sushi material or materials 5 are blocked by the bent portions 20 to prevent the side ends of the sushi material or materials 7 of the sushi product 3 from being heated by the sideward microwaves.

Figure 6:
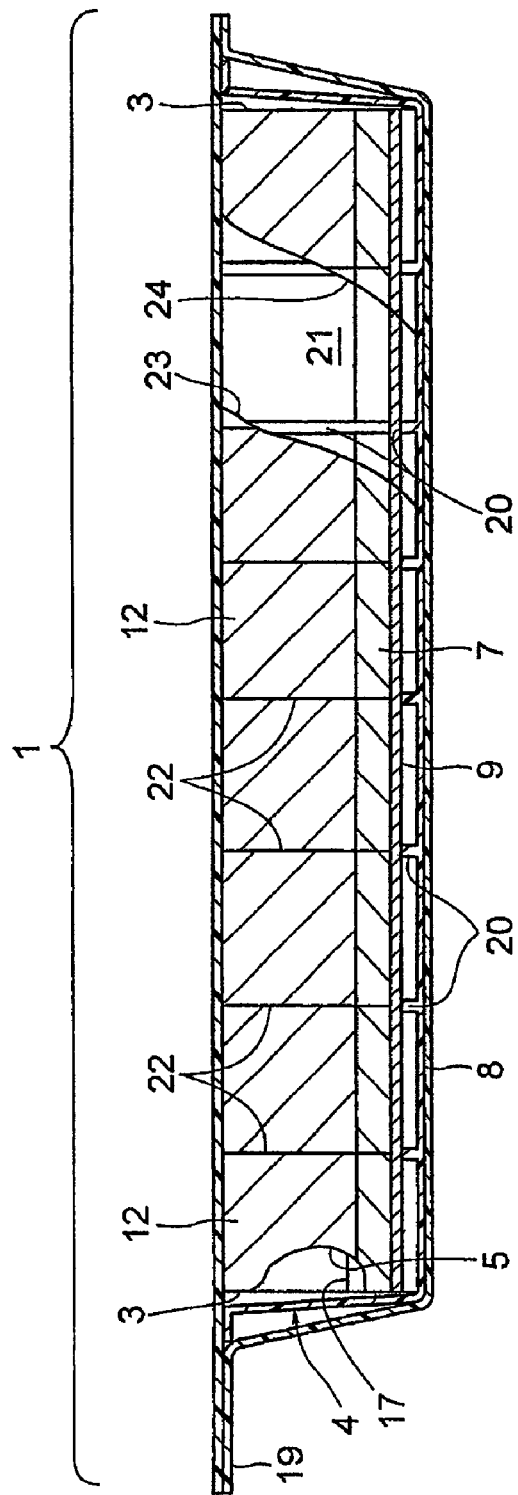
FIG. 6 is a schematic front sectional view schematically illustrating a still further Example of the present invention which is different from Example shown in FIGS. 1 to 5.
Figure 7:
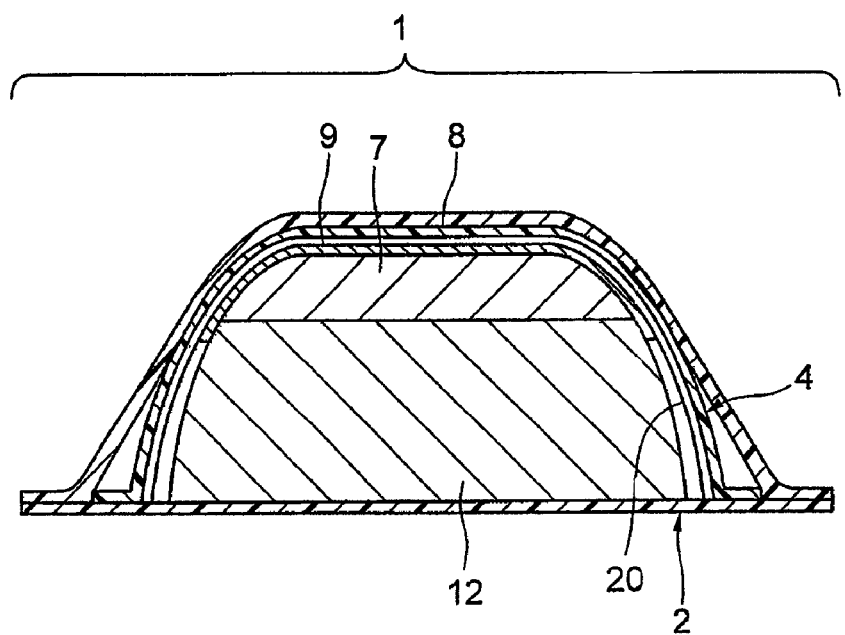
FIG. 7 is a schematic side sectional view schematically illustrating Example shown in FIG. 6.

In FIGS. 6 and 7, Example different from Examples shown in FIGS. 1 to 5 is shown. In Example shown in FIGS. 6 and 7, a box 4 is made of a polypropylene. As shown in FIG. 7, the box 4 has a reversed semicylindrical shape (revised kamaboko-like shape). This shape is so designed formed as to substantially conform with the shape of the sushi product placed on the bottom of the box 4. In this Example, the plastic box 4 for containing a packed frozen sushi product 1 is formed with 7 ribs 20 along each of inner walls which inward extend from the inner walls with a view to reinforcing the box 4 and maintaining the shape of the box 4. The sushi product may be contained in the box 4 in such a manner that it is placed through the spaces 21 between the ribs 20 on the ribs 20 with its sushi material or materials 7 down and shaped rice section 12 thereon. Alternatively, the sushi product may be cut into pieces and each of the pieces may be placed in the space 21 between the ribs 20 so that each rib 2 is interposed between the pieces. In this Example, in a case of rod-shaped sushi product or boxed sushi product, the sushi product is contained in the box 4 in such a manner that it is precut along cut lines 22 so as to be separable into 8 pieces afterward and placed on the ribs 20. FIG. 6 shows the ribs 20 and the spaces 21 between the ribs 20 with no sushi product is contained in the box by cutting lines 23 and 24. Of course, in the this Example, the box may be used as a container for an uncut rod-shaped sushi product or boxed sushi product. In this Example, the ribs are provided on the inside of the box. However, the ribs may be provided on the outside of the box.

Example 10

In substantially the same manner as in Example 5, 220 g of the rice vinegared and cooled to 50° C. was topped with 100 g of a boned, lightly salted and marinated fillet of mackerel as a sushi material, and thereon, with 8 g of a thin slice of kombu kelp (shiroita kombu) cooked in a broth seasoned with vinegar, sugar and salt and then cooled was placed to prepare each of mackerel-topped boxed sushi products of 5.5 cm in width, 18 cm in length and 3.0 cm in thickness (L size). Each of the boxed sushi products was precut into 8 pieces and placed with its sushi materials down in a plastic box which has a reversed semicylindrical shape and on the bottom of which is placed a laminated aluminum foil. In this Example, the laminated aluminum foil used was composed of a polyethylene terephthalate (PET) layer having a thickness of 12 μm as a top layer, and thereunder, an aluminum layer having a thickness of 9 μm, and thereunder, a polypropylene layer as used in a retort pouch and having a thickness of 70 μm, and the laminated aluminum foil measured 6.5 cm in width, and 19.5 cm in length. The box had inner dimensions of 6.2 cm in width and 18.2 cm in length in the bottom, and 6.2 cm in width and 19.2 cm in length in the top opening, and 3.0 cm in depth. The box which contained the boxed sushi product was placed in a packing bag made of a laminated film composed of a polyethylene film as an inner layer and a nylon film as an outer layer, and the packing bag was vacuumed by a vacuum pump under a pressure of 40 cmHg and had its mouth heat-sealed. In the vacuumed packing bag, its top portion was depressed and in tight contact with the shaped rice section. A space is formed around the sushi product in the packing bag, and a volume thereof was 0.37 times that of the sushi product.

The packing bag, in which the boxed sushi product had been placed together with the box containing the same and which had been vacuumed and heat-sealed, was kept in ethyl alcohol having a temperature of −35° C. as a brine for 45 minutes and thereby brine-frozen to obtain a packed frozen sushi product. In the packed frozen sushi product, the packing bag as an outer covering and the contents are frozen together in a unified form. The packed frozen sushi products thus prepared were stored in an insulated storage at −18.6° C. on average.

In cooking the packed frozen sushi product, thawing was performed by means of a 500 W microwave oven. The packed frozen sushi product was placed in the microwave oven and thawed by applying heat for 4.5 minutes. 4.5 minutes after (completion of) the thawing, the thawed packed sushi product was removed from the microwave oven and allowed to stand at room temperature for 30 minutes to effect steaming.

In the course of the steaming, temperatures of predetermined positions of the sushi product were measured immediately after the thawing, after a lapse of 15 minutes in the steaming (in Table, referred to as "post-15 minutes-steaming") and after a lapse of 30 minutes (in Table, referred to as "post-30 minutes-steaming"). The results are shown in Table 10.

In Table 10, "upper portion of the side of the end portion of the rice section" means a temperature of a right corner of the exposed shaped rice section where three edges meet together on the side of the thawed sushi product which faces the opening of the container ("upper portion of center of the side of the end portion in the longitudinal direction" means a temperature of a right corner of the thawed sushi product where three edges of the exposed shaped rice section meet together on the side facing the opening the container.) "Center portion of the top surface of the rice section" means a temperature of a portion at the center of the width and at the longitudinal center of the top surface of the shaped rice section. "End portion in the aluminum foil-side surface of the sushi material or materials" means a temperature of a portion 1 cm inner from the end in the container bottom-side thawed sushi surface in contact with the laminated aluminum foil. "Center portion of the aluminum foil-side surface of the sushi material or materials" means a temperature of a portion at the center of width and at the longitudinal center of the container bottom-side thawed sushi surface in contact with the laminated aluminum foil. Further, "end portion of the rice-side surface of the sushi material or materials" means a temperature of a portion at the center of width and at the longitudinal center of the container bottom-side thawed sushi surface in contact with the shaped rice section.

TABLE 10

|  | Temp. ° C. immediately After thawing | Post-15 minutes-steaming | post-30 minutes-steaming |
| --- | --- | --- | --- |
| Upper portion of the side of the end portion of the rice section | 75.9 | 33.5 | 29.3 |
| Center portion of the top surface of the rice section | 49.8 | 16.7 | 13.8 |
| End portion in the aluminum foil-side surface of the sushi material or materials | 17.7 | 9.5 | 23.3 |
| Center portion of the aluminum foil-side surface of the sushi material or materials | −0.5 | 2.2 | 4.3 |
| End portion of the rice-side surface of the sushi material or materials | 40.2 | 6.9 | 23.2 |

In the packed sushi product, there was a difference of approximately 26° C. between its center portion of the top surface of the rice section and its upper portion of the side of the end portion of the rice section immediately after the thawing. At the time of completion of the steaming for 30 minutes, however, the shaped rice section and the sushi material or materials of the sushi product had temperatures of approximately 10° C. or higher as a whole and a roughly uniformized temperature distribution, although center portions thereof remained at somewhat low temperatures. In consequence, the boxed sushi product rendered easy-to-cut with a kitchen knife.

In this Example, the boxed sushi product was sufficiently thawed by the steaming for 30 min. As opposed to this, in a case where a sushi product was tightly wrapped with a wrapping film to form a space having a volume 0.1 times or less that of the sushi product, steaming for 45 minutes or longer is required to sufficiently thaw the sushi product. This shows that the steaming time was shortened by 15 minutes or more in this Example.

In this Example, a laminated metal foil such as a plastic-laminated aluminum foil is placed on a bottom of a polypropylene box. However, the outer surface of the bottom of the polypropylene box may be vapor-deposited or plated with a metal such as aluminum, and such a box as a polypropylene box having the outer surface of its bottom covered with an aluminum layer may be used The packed frozen sushi product of the present invention comprises a vacuumed and frozen hermetically sealed plastic packing bag, an open-topped box placed in the packing bag, a laminated metal foil placed on the bottom of the box, and a frozen sushi product placed on the laminated metal foil with its sushi material or materials on the laminated metal foil, and the packed frozen sushi product is frozen in a unified form. Accordingly, the packed frozen sushi product can be thawed using a microwave oven to bring temperatures of the rice section to tepid temperatures and temperatures or the sushi material or materials to about 10° C. in a relatively short period of time. In the present invention, since a laminated metal foil is placed on the bottom of the plastic box, when a prepared sushi product or frozen sushi product is placed in the box with its sushi material or materials down, the upper surface or surfaces of the sushi material or materials are necessarily covered with the laminated metal foil to thereby render registration between the positions of the sushi material or materials and the laminated metal foil easy. Accordingly, when the sushi product or frozen sushi product is simply placed in the plastic box, the sushi material or materials can entirely be covered with the laminated metal foil. Further, after placement of the sushi product or frozen sushi product in the plastic box, no substantial positional dislocation of the laminated metal foil relative to the sushi material or materials is likely to be caused. By virtue of this, the packed frozen sushi product can be prepared efficiently, and increased product yield is realized.

As described above, in the present invention, the vacuum-packed frozen sushi product may be prepared relatively easily by placing a laminated metal foil on a bottom of a plastic box, placing a sushi product or products on the laminated metal foil in the plastic box with a sushi material or materials down, placing the sushi product or products in a flexible plastic packing bag together with the plastic box containing the same, vacuuming the packing bag, i.e., bringing the inside of the packing bag into a vacuumed condition, and sealing a mouth of the packing bag, followed by freezing. Alternatively, the vacuum-packed frozen sushi product may be prepared relatively easily by placing a laminated metal foil in a plastic box, placing a sushi material or materials on the laminated metal foil, placing vinegared rice (sushi rice) on the sushi material or materials to prepare a sushi product on the laminated metal foil in the plastic box, placing the prepared sushi product in a flexible packing bag together with the plastic box containing the same, vacuuming the packing bag, and sealing a mouth of the vacuumed packing bag, followed by freezing. In a case where a frozen sushi product or products are placed in a plastic box to prepare a packed frozen sushi product, the packed frozen sushi product may be prepared relatively easily by placing a frozen sushi product or products in a plastic box with a sushi material or materials down, placing the frozen sushi product or products in a flexible plastic packing bag such as a packing bag made of a plastic film together with the box containing the same, vacuuming the plastic bag, sealing a mouth of the vacuumed plastic packing bag, and cooling the sealed plastic packing bag with a refrigerant such as brine to freeze the sealed plastic packing bag.

INDUSTRIAL APPLICABILITY

The packed frozen sushi product of the present invention comprises a vacuumed and frozen hermetically sealed flexible plastic packing bag, an open-topped box placed in the packing bag, a laminated metal foil placed on the bottom of the box, and a frozen sushi product placed on the laminated metal foil with its sushi material or materials in contact with the laminated metal foil, and the packed frozen sushi product is frozen in a unified form. Accordingly, the packed frozen sushi material can be thawed and brought ready to serve using a microwave oven with ease in a relatively short period of time. As described above, the packed frozen sushi product of the present invention can be cooked simply and easily. By virtue of this, boxed sushi products using a seasonal sushi material or materials which have been frozen and stored can easily be served irrespective of season.

Further, in the present invention, since a laminated metal foil is placed on a bottom of a plastic box, when a prepared sushi product or frozen sushi product is placed in the box with its sushi material or materials down, the sushi material or materials are necessarily covered with the laminated metal foil to thereby render registration between the positions of the sushi material or materials and the laminated metal foil simple and easy. Accordingly, the packed frozen sushi product can be prepared mechanically and thus efficiently on a large scale. Further, it has been considered difficult but is now realized that the procedure to prepare the frozen packed sushi product or products may be performed almost mechanically with no substantial manual intervention and thus easily automatized to enable frozen packed sushi products of high quality to regularly be produced. Therefore, the present invention has a high industrial applicability.

The invention claimed is:

1. A vacuum-packed frozen sushi product configured for microwave cooking, said vacuum-packed frozen sushi product comprising:
   a vacuumed, frozen and hermetically sealed flexible plastic packing bag which is vacuumed to a pressure of 600 mm Hg or lower;
   an open-topped plastic box having a top opening and a bottom, the top opening of which is formed as to be broader than the bottom, placed in said packing bag;
   a laminated metal foil placed on the bottom of said box; and
   a frozen sushi product which is formed by at least one shaped form of frozen boiled rice and a sushi material placed on a surface of each form of said at least one shaped form of frozen boiled rice, and which is contained in said box with its sushi material or materials each in contact with said laminated metal foil which is provided with portions upwardly extending from the bottom of said box along box walls to cover each of the sushi material or materials at least in part in the longitudinal direction or width direction or the longitudinal and the width direction;
   a space being formed in the packing bag around said sushi product in the vacuumed condition, which provides interspaces between the sushi product and the plastic box and between the plastic box and the packing bag,
   an inner surface of said plastic packing bag being in contact with an upper surface of the shaped rice section of said sushi product,
   said plastic packing bag, said plastic box, said laminated metal foil and said frozen sushi product being frozen together in a unified form,
   the space formed around the sushi product in said packing bag having a volume 0.2 to 0.6 times that of said sushi product at the time of thawing, by means of microwave, and after thawing, the resulting packed sushi product being configured to stand for a period of 15 to 45 minutes without unpacking, allowing water vapor emanating at least from the shaped rice section to flow in a space formed between the sushi product and the box, thereby steaming the shaped rice section and the sushi material or materials between 10° C. and 30° C.

2. The packed frozen sushi product adapted for microwave cooking according to claim 1, wherein the box is a box-, or shallow cylinder-like-, tray- or dish-like container having a rectangular (including square), circular or oval shape when viewed in plan.

3. The packed frozen sushi product adapted for microwave cooking according to claim 1, wherein the plastic packing bag is a packing bag for microwave cooking made of a laminated film composed of a nylon film and a polypropylene film having a thickness larger than that of the nylon film.

* * * * *